United States Patent
Imai

(10) Patent No.: US 10,416,484 B2
(45) Date of Patent: Sep. 17, 2019

(54) LIQUID CRYSTAL DISPLAY DEVICE AND METHOD OF DRIVING LIQUID CRYSTAL DISPLAY DEVICE

(71) Applicant: SHARP KABUSHIKI KAISHA, Sakai, Osaka (JP)

(72) Inventor: Masahiro Imai, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/147,610

(22) Filed: Sep. 29, 2018

(65) Prior Publication Data
US 2019/0101778 A1    Apr. 4, 2019

(30) Foreign Application Priority Data
Oct. 3, 2017  (JP) .................. 2017-193627

(51) Int. Cl.
| G02F 1/133 | (2006.01) |
| G02F 1/1362 | (2006.01) |
| G09G 3/36 | (2006.01) |
| G09G 3/34 | (2006.01) |
| G02F 1/1335 | (2006.01) |

(52) U.S. Cl.
CPC .... *G02F 1/13306* (2013.01); *G02F 1/133602* (2013.01); *G02F 1/136286* (2013.01); *G09G 3/3648* (2013.01); *G09G 3/3677* (2013.01); *G09G 3/3688* (2013.01); *G09G 3/342* (2013.01); *G09G 3/3666* (2013.01); *G09G 2300/043* (2013.01); *G09G 2310/08* (2013.01); *G09G 2320/0252* (2013.01); *G09G 2320/064* (2013.01)

(58) Field of Classification Search
None
See application file for complete search history.

(56) References Cited

U.S. PATENT DOCUMENTS

| 2002/0008685 A1 | 1/2002 | Ban et al. |
| 2003/0080932 A1 | 5/2003 | Konno et al. |
| 2004/0041760 A1 | 3/2004 | Tsumura et al. |
| 2009/0040444 A1* | 2/2009 | Tsuchiya ............... G02F 1/1395 349/122 |
| 2011/0250713 A1* | 10/2011 | Kawasaki ............ H01L 29/458 438/34 |
| 2013/0271441 A1 | 10/2013 | Ahn et al. |

(Continued)

FOREIGN PATENT DOCUMENTS

| JP | 2001-265287 A | 9/2001 |
| JP | 2003-131635 A | 5/2003 |

(Continued)

*Primary Examiner* — Nicholas J Lee
(74) *Attorney, Agent, or Firm* — ScienBiziP, P.C.

(57) ABSTRACT

In a liquid crystal display device, an auxiliary capacitance wiring driver changes a potential of an auxiliary capacitance wiring so that a dielectric torque of liquid crystal molecules of a pixel (PXj) to which a minimum voltage corresponding to a backlight is written becomes larger while the backlight is turned off, and a scanning signal line driver drives a scanning signal line so that image data is written to the pixel in a state in which the potential of the auxiliary capacitance wiring is changed so that the dielectric torque of the liquid crystal molecules of the pixel becomes larger.

9 Claims, 6 Drawing Sheets

(56) References Cited

U.S. PATENT DOCUMENTS

2014/0362323 A1* 12/2014 Nakano ............ G02F 1/136213
                                                      349/46
2017/0146869 A1*  5/2017 Hirosawa .......... G02F 1/133512

FOREIGN PATENT DOCUMENTS

| JP | 2003-222902 A | 8/2003 |
| JP | 2004-093717 A | 3/2004 |
| JP | 2013-222206 A | 10/2013 |
| WO | 2013/042622 A1 | 3/2013 |

* cited by examiner

LIQUID CRYSTAL DISPLAY DEVICE AND METHOD OF DRIVING LIQUID CRYSTAL DISPLAY DEVICE

BACKGROUND

1. Field

The present disclosure relates to a liquid crystal display device and a method of driving the liquid crystal display device.

2. Description of the Related Art

Liquid crystal display devices are widely used as thin, lightweight, low power consumption display devices. In a liquid crystal display device, a backlight for irradiating the back surface of a liquid crystal display panel with light is provided. As a light source included in the backlight, for example, a light emitting diode (LED) is used.

Japanese Unexamined Patent Application Publication No. 2001-265287 discloses a display device including a driver for driving an auxiliary capacitance line so that display luminance decreases only for a predetermined period. As a result, the display device performs false impulse display.

However, the display device of Japanese Unexamined Patent Application Publication No. 2001-265287 drives an auxiliary capacitance line during a period in which the backlight is turned on. Therefore, the display luminance of a pixel after image data is written varies.

In addition, in a state in which a long axis of liquid crystal molecules is parallel or perpendicular to the direction of an electric field, that is, in a state in which a minimum voltage is applied to the pixel, the dielectric torque applied to the liquid crystal molecules is small. Therefore, in a normally black liquid crystal display device, the response time of liquid crystal molecules becomes long in the case of switching from the lowest gradation to a high gradation side. On the contrary, in a normally white liquid crystal display device, the response time of the liquid crystal molecules becomes long when switching from the highest gradation to a low gradation side. In this way, the response time may vary according to the gradation of an immediately preceding frame.

SUMMARY

According to an aspect of the disclosure, it is desirable to realize a liquid crystal display device capable of high-speed response.

According to an aspect of the disclosure, there is provided a liquid crystal display device including a data driver writing image data to a plurality of pixels, a scanning signal line driver driving a plurality of scanning signal lines, a plurality of auxiliary capacitance wirings forming an auxiliary capacitance between the plurality of auxiliary capacitance wirings and the plurality of pixels, an auxiliary capacitance wiring driver driving the plurality of auxiliary capacitance wirings, and a first backlight, in which the auxiliary capacitance wiring driver changes a potential of a first auxiliary capacitance wiring so that dielectric torque of liquid crystal molecules of a first pixel, to which a minimum voltage is written, corresponding to the first backlight becomes larger while the first backlight is turned off, and the scanning signal line driver drives the scanning signal line so that the image data is written to the first pixel in a state in which the potential of the first auxiliary capacitance wiring is changed so that the dielectric torque of the liquid crystal molecules of the first pixel becomes larger.

According to another aspect of the disclosure, there is provided a method of driving a liquid crystal display device including a plurality of auxiliary capacitance wirings forming an auxiliary capacitance between the plurality of auxiliary capacitance wirings and a plurality of pixels and a first backlight, including changing a potential of a first auxiliary capacitance wiring so that a dielectric torque of liquid crystal molecules of a first pixel, to which a minimum voltage is written, corresponding to the first backlight becomes larger while the first backlight is turned off and writing image data to the first pixel in a state in which the potential of the first auxiliary capacitance wiring is changed so that the dielectric torque of the liquid crystal molecules of the first pixel becomes larger.

DESCRIPTION OF THE EMBODIMENTS

Embodiment 1

Dielectric Torque Acting on Liquid Crystal Molecules

Figure 1:
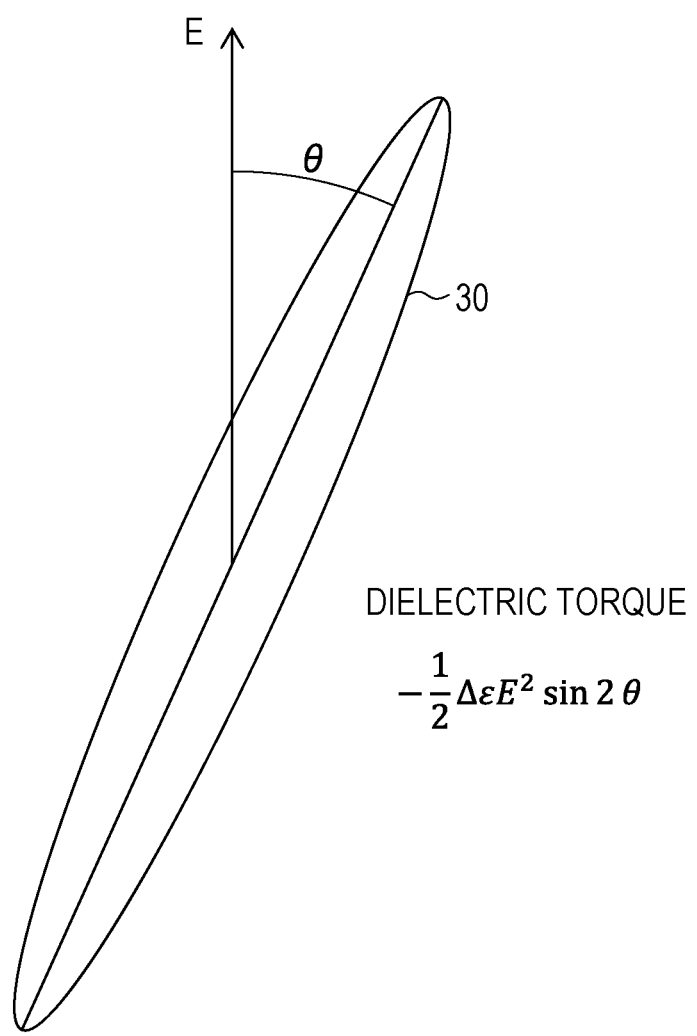
FIG. 1 is a diagram for describing a dielectric torque applied to liquid crystal molecules.

FIG. 1 is a diagram for describing a dielectric torque applied to liquid crystal molecules. It is assumed that $\theta$ is the angle of a long axis of liquid crystal molecules 30 with respect to the direction of an electric field E. It is assumed that $\Delta\varepsilon$ is the dielectric anisotropy of the liquid crystal molecules 30. At this time, the dielectric torque acting on the liquid crystal molecules 30 tilted by the angle $\theta$ with respect to the electric field E is expressed by the following equation.

$$\text{Dielectric torque} = (-\tfrac{1}{2})\Delta\varepsilon E^2 \sin 2\theta \tag{1}$$

That is, when $\theta=0°$ or $\theta=90°$, the dielectric torque becomes 0. In a vertical alignment (VA) type liquid crystal display panel, $\theta \approx 0°$ in a state in which no voltage is applied to a pixel. In a normally black vertical alignment type liquid crystal display panel, $\theta$ is close to 0° and the dielectric torque is small in the state of black display (the state in which a minimum voltage is applied). In addition, when a voltage is applied to the pixel, $\theta$ increases. Therefore, in the case of low gradation display in which $\theta$ is small, the voltage applied to the liquid crystal and the electric field E become smaller. Therefore, for example, in the case of transitioning from black display to low gradation display, the response time of the liquid crystal is the longest.

For example, even in a twisted nematic (TN) alignment type liquid crystal display panel, the dielectric torque of Equation (1) acts on the liquid crystal molecules 30. In the TN type liquid crystal display panel, in a state in which no voltage is applied to the pixel, $\theta \approx 90°$. In a normally white TN type liquid crystal display panel, $\theta$ is close to 90° and the dielectric torque is small in the state of white display (the state in which the minimum voltage is applied). When a voltage is applied to the pixel, θ decreases. Therefore, in the case of high gradation display in which θ is large, the voltage applied to the liquid crystal and the electric field E become smaller. Therefore, for example, when transitioning from white display to high gradation display, the response time of the liquid crystal becomes long.

In the liquid crystal display device of the present embodiment, the absolute value of the pixel voltage of the pixel is increased via an auxiliary capacitance middle gradation wiring, the liquid crystal molecules are transitioned to a halftone state in which the dielectric torque is likely to act, and then the image data is written to the pixel. As a result, in the normally black display device, the response time of liquid crystal molecules when transitioning from black display to low gradation display is shortened. Therefore, a maximum value of the response time in the entire gradation range becomes smaller, and the response time is averaged. Hereinafter, the liquid crystal display device of the present embodiment will be described in detail.

Configuration of Liquid Crystal Display Device

Figure 2:
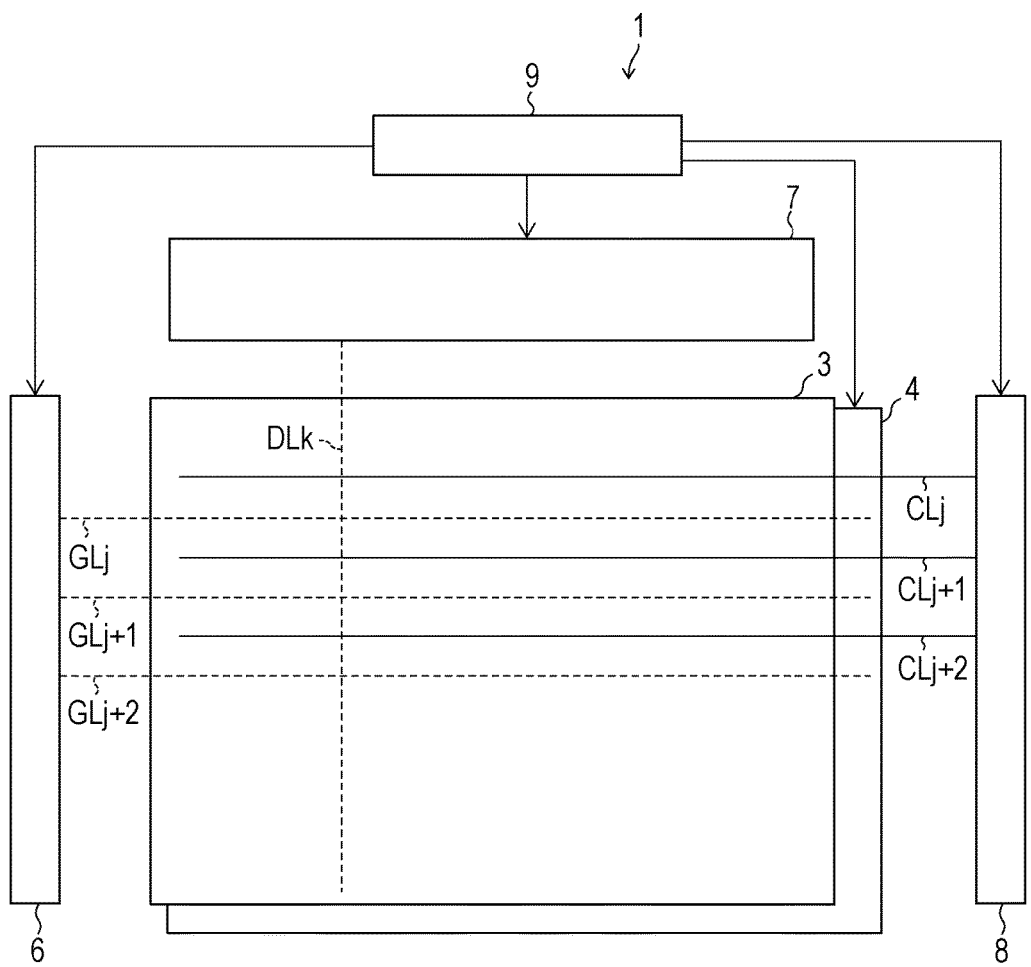
FIG. 2 is a schematic diagram showing a configuration of a liquid crystal display device according to one embodiment.

FIG. 2 is a schematic diagram showing a configuration of a liquid crystal display device of the present embodiment. The liquid crystal display device 1 includes a liquid crystal display panel 3, a backlight 4 (first backlight), a gate driver 6 (scanning signal line driver), a data driver 7, an auxiliary capacitance wiring driver 8, and a display control circuit 9. The liquid crystal display device 1 is a normally black vertical alignment type liquid crystal display device. The display control circuit 9 controls the backlight 4, the gate driver 6, the data driver 7, and the auxiliary capacitance wiring driver 8. The respective functions of the display control circuit 9, the gate driver 6, the data driver 7, and the auxiliary capacitance wiring driver 8 may be constituted by one integrated circuit (IC) or may be constituted by a circuit inside the liquid crystal display panel. The backlight 4 irradiates the entire display regions of the liquid crystal display panel 3 with light from the back surface of the liquid crystal display panel 3. The display control circuit 9 includes a timing controller (not shown) for generating various timing signals. The display control circuit 9 supplies a CS timing signal to the auxiliary capacitance wiring driver 8. In addition, a plurality of reference potentials for generating capacitance signals are supplied from a power source (not shown) to the auxiliary capacitance wiring driver 8. The same power source as the gate driver 6 may be used as the power source of the auxiliary capacitance wiring driver 8, the same power source as the data driver 7 may be used, or a power source different from the gate driver 6 and the data driver 7 may be used.

The liquid crystal display panel 3 includes a plurality of pixels, a plurality of scanning signal lines GLj, a plurality of data signal lines DLk, and a plurality of auxiliary capacitance wirings CLj. The subscript j represents a j-th row, and the subscript k represents a k-th column. It is assumed that n is the number of pixel rows included in the display region.

The gate driver 6 drives a plurality of scanning signal lines GLj by supplying scanning signals. The data driver 7 drives a plurality of data signal lines DLk by supplying data signals. The auxiliary capacitance wiring driver 8 generates a capacitance signal based on the plurality of reference potentials and the CS timing signal. In addition, the auxiliary capacitance wiring driver 8 is connected to the plurality of auxiliary capacitance wirings CLj. The auxiliary capacitance wiring driver 8 drives a plurality of auxiliary capacitance wirings CLj by supplying capacitance signals.

Configuration of Liquid Crystal Display Panel

Figure 3:
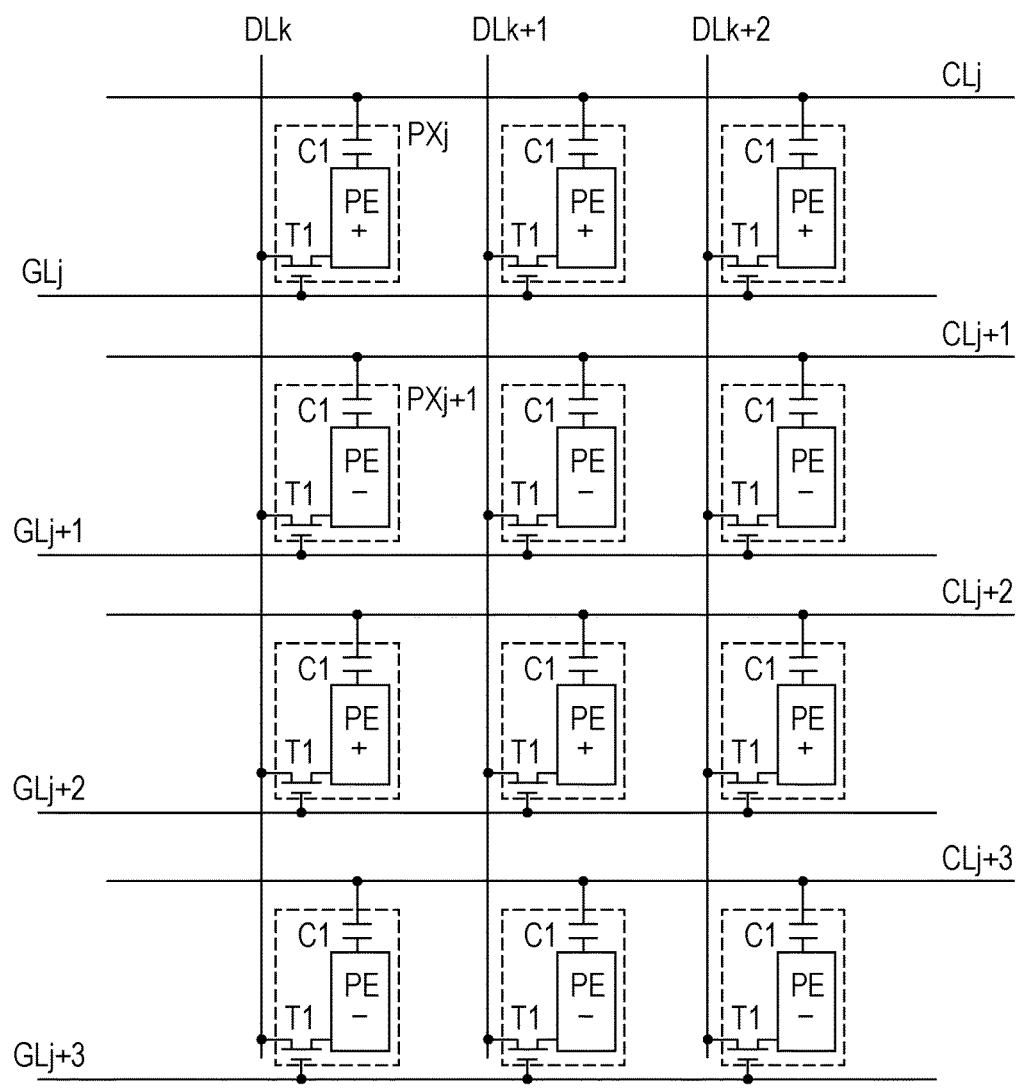
FIG. 3 is a circuit diagram showing a configuration of a part of a liquid crystal display panel of the liquid crystal display device.

FIG. 3 is a circuit diagram showing a configuration of a part of the liquid crystal display panel 3 of the liquid crystal display device. A pixel PXj is formed at the intersection of the scanning signal line GLj of the j-th row and the data signal line DLk of the k-th column. One pixel typically represents one color component of red, green and blue (RGB), and one picture element includes three pixels corresponding to RGB. Of course, even though the color components constituting a picture element are four kinds of RGBY (Y is yellow) or RGBW (W is white) or five kinds of RGBYC (C is cyan), the same way may be considered.

The auxiliary capacitance wiring CLj extends along the pixel row so as to be adjacent to or at least partially overlapping the pixel PXj. Each pixel PXj includes a pixel electrode PE. The pixel electrode PE faces a counter electrode (common electrode: not shown) via the liquid crystal layer.

The pixel PXj will be described. A plurality of pixels have the same configuration. The pixel electrode PE is connected to the corresponding data signal line DLk via a transistor T1. The control terminal of the transistor T1 is connected to the scanning signal line GLj. The scanning signal line GLj controls the writing of the data signal (image data) to the pixel by controlling the conduction/non-conduction of the transistor T1 (switching element). An auxiliary capacitance C1 is formed between the pixel electrode PE of the pixel PXj and the auxiliary capacitance wiring CLj. The auxiliary capacitance wiring CLj in the j-th row forms a plurality of auxiliary capacitances C1 between the auxiliary capacitance wiring CLj and the plurality of pixels PXj in the corresponding pixel row (j-th row).

Driving of Liquid Crystal Display Device

The liquid crystal display device 1 performs line inversion driving as a polarity inversion driving system. However, the present embodiment is not limited thereto, and the liquid crystal display device 1 may perform frame inversion driving, for example. In FIG. 3, the polarity of the data signal written to each pixel electrode PE in a certain vertical period is indicated by + and −.

Figure 4:
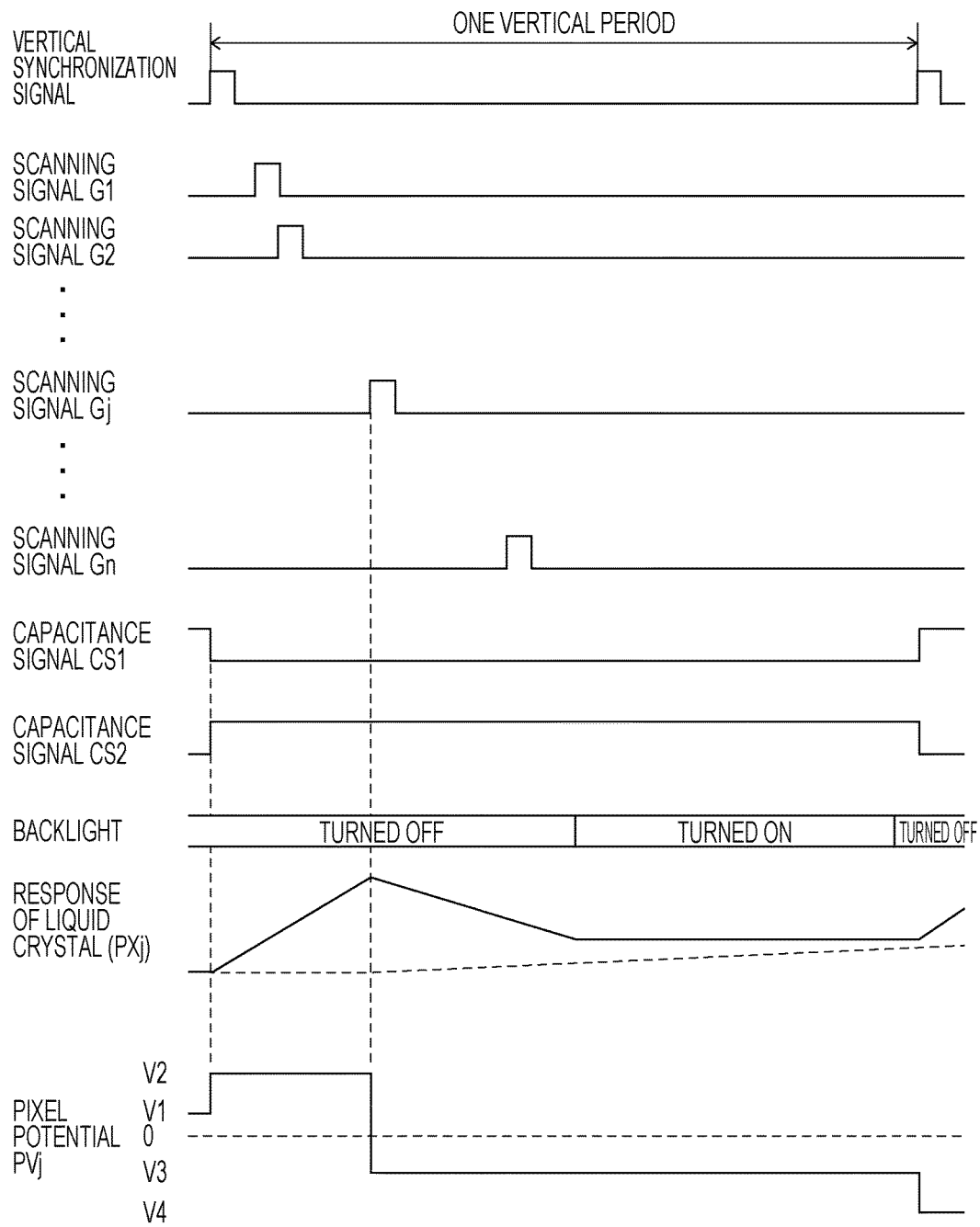
FIG. 4 is a timing chart showing an example of driving the liquid crystal display device in a certain vertical period.

FIG. 4 is a timing chart showing an example of driving the liquid crystal display device 1 in a certain vertical period. FIG. 4 shows the vertical synchronization signal, the potentials (gate potentials) of scanning signals G1 to Gn supplied to scanning signal lines GL1 to GLn, respectively, the potentials (CS potentials) of capacitance signals CS1 and CS2 supplied to auxiliary capacitance wirings CL1 to CLn, a potential (pixel potential) PVj of the pixel electrode PE in the pixel PXj of the j-th row of a certain pixel column, the state of the backlight (turned on/off), and the alignment state (response of liquid crystal) of the liquid crystal in the pixel PXj, with respect to time (horizontal axis). In FIG. 4, a low value of "response of liquid crystal" indicates the orientation (θ is small) of the liquid crystal molecules when the transmittance (luminance) is low and the electric field E is small, and a high value of "response of liquid crystal" indicates the orientation of the liquid crystal molecule (θ is large) when the transmittance (luminance) is high and the electric field E is large. For the sake of simplicity, the influence of the pixel potential pulling in due to a gate parasitic capacitance here is ignored. The broken line at "pixel potential" in FIG. 4 indicates the potential of the counter electrode. The solid line in "liquid crystal response" in FIG. 4 shows the change in transmittance (luminance, orientation of liquid crystal) in the pixel PXj, and the dotted line in "liquid crystal response" shows the change in transmittance (luminance, orientation of liquid crystal) in the pixel PXj in a case where the auxiliary capacitance wiring is not driven. A vertical period is generally 1/60 second (driving frequency 60 Hz) in many cases. However, in applications requiring high-quality moving image performance, a high-driving frequency such as 90 Hz, 120 Hz, or 240 Hz may be required in some cases. In the case of operating at such a high driving frequency and not driving the auxiliary capacitance wiring, the transmittance (luminance, orientation of the liquid crystal) of the pixel to which image data is written may not reach the desired value within a vertical period in some cases. Therefore, it is required to make the liquid crystal respond at a high speed.

The auxiliary capacitance wiring driver 8 supplies the capacitance signal CS1 to each of the auxiliary capacitance wirings of the odd rows and supplies the capacitance signal CS2 to each of the auxiliary capacitance wirings of the even rows. The waveform of the capacitance signal CS1 is obtained by inverting the positive and negative of the waveform of the capacitance signal CS2.

Before the vertical period starts, the display control circuit 9 turns off the backlight 4. Thereafter, the display control circuit 9 outputs the vertical synchronization signal to the gate driver 6, the data driver 7, and the auxiliary capacitance wiring driver 8. When receiving the vertical synchronization signal, the auxiliary capacitance wiring driver 8 changes the potentials of the capacitance signals CS1 and CS2 while the backlight 4 is turned off. The potentials of the capacitance signals CS1 and CS2 are kept constant until a next vertical period starts. The potentials of the capacitance signals CS1 and CS2 change every vertical period.

When receiving the vertical synchronization signal, the gate driver 6 drives the plurality of scanning signal lines GL1 to GLn by supplying the scanning signals G1 to Gn to the plurality of scanning signal lines GL1 to GLn after the potentials of the capacitance signals CS1 and CS2 are changed. As a result, the data signal supplied from the data signal line is written to each pixel. After the writing of the data signal to the pixel of the bottom row (n-th row) is completed, the display control circuit 9 turns on the backlight 4. An image is displayed while the backlight 4 is substantially turned on, and therefore the user may recognize the displayed image. The display control circuit 9 turns off the backlight 4 before the vertical period ends.

The pixel PXj of the j-th row will be described. Here, it is assumed that the pixel PXj is in an even row. Before the vertical period described above in FIG. 4 starts, that is, in an immediately preceding vertical period, it is assumed that a data signal having a positive polarity corresponding to black display (gradation 0) is written to the pixel PXj. Here, it is assumed that the potential of the counter electrode is 0 V (reference). At this time, the pixel potential PVj of the pixel PXj is V1. In this example, |V1|<|V3|<|V2|<|V4|.

When a new vertical period starts, the potential of the capacitance signal CS2 of the auxiliary capacitance wire CLj corresponding to the pixel PXj rises while the backlight 4 is turned off. The auxiliary capacitance wiring CLj and the pixel PXj are connected via the auxiliary capacitance C1. At this time, since the transistor T1 of the pixel PXj is in the OFF (non-conduction) state, when the potential of the capacitance signal CS2 of the auxiliary capacitance wiring CLj rises, the pixel potential PVj of the pixel PXj rises to V2 via the auxiliary capacitance C1. A potential change $\Delta Vd$ of the pixel potential PVj is expressed by the following equation.

$$\Delta Vd = \Delta VCS \times CCS/Cp \quad (2)$$

Here, $\Delta VCS$ represents the potential change of the capacitance signal CS2, CCS represents the capacitance value of the auxiliary capacitance C1, and Cp represents the capacitance value of the pixel capacitance (the capacitance formed between the pixel electrode and the counter electrode or the like). As a result, the orientation of the liquid crystal molecules of the pixel PXj starts to change to an orientation corresponding to the changed pixel potential V2. However, the change in the orientation of the liquid crystal molecules is slow, and the change in the orientation is not completed in one horizontal period. Regardless of the polarity of the pixel potential, the orientation of the liquid crystal molecules of the pixel PXj changes to the orientation in accordance with the absolute value of the pixel potential PVj, assuming that the potential of the counter electrode is 0 V.

Thereafter, a scanning signal Gj becomes High level, and the transistor T1 of the pixel PXj is turned on (conduction). At this time, a negative polarity data signal having a polarity opposite to the immediately preceding vertical period is written to the pixel PXj. As a result, the pixel potential PVj of the pixel PXj changes to a negative potential (V3) corresponding to the potential of the data signal. Then, as the pixel potential changes to V3 corresponding to the data signal, the orientation of the liquid crystal molecules of the pixel PXj starts to change to the orientation corresponding to the pixel potential V3. After the response time elapses, the orientation of the liquid crystal molecules of the pixel PXj is oriented in accordance with the pixel potential V3 (corresponding to the gradation represented by the data signal).

When a data signal is written to the pixel PXj, the orientation of the liquid crystal molecules of the pixel PXj, which corresponds to the black display (the state in which the minimum voltage is applied) at the start of the vertical period, temporarily changes to an orientation corresponding to the pixel potential V2 or a level in the intermediate stage thereof. That is, the angle θ between the electric field E and the long axis of the liquid crystal molecules 30 becomes larger to some extent. Therefore, the dielectric torque received by the liquid crystal molecules 30 from the electric field E becomes larger. Therefore, a large dielectric torque acts on the liquid crystal molecules 30 as compared with the case where the data signal is written directly to the pixel of black display (θ≈0) without changing the potential of the capacitance signal. Therefore, even if the data signal written to the pixel PXj is image data of low gradation (electric field E is small), the liquid crystal display device 1 may cause the liquid crystal molecules 30 to respond at a high speed with a large dielectric torque.

From Equation (2) above, if the potential change $\Delta VCS$ of the capacitance signal is increased, the potential change $\Delta Vd$ of the pixel potential may be increased, thereby increasing the dielectric torque of the liquid crystal molecules. Usually, the drive voltage (the difference between High level and Low level) of the scanning signal line is the maximum among a plurality of power source voltages used in the liquid crystal display device. Therefore, $\Delta Vd$ may be increased without adding a new power source voltage by making the drive voltage of the auxiliary capacitance wiring the same as the drive voltage of the scanning signal line (the power source of the gate driver 6 and the power source of the auxiliary capacitance wiring driver 8 are made common). However, a large current supply capability is not required for driving the scanning signal line. In a case where the current supply capability of the power source of the gate driver 6 is low and the auxiliary capacitance wiring may not be driven at a sufficiently high speed with the power source of the gate driver 6, the power source of the data driver 7 having a high current supply capability and the power source of the auxiliary capacitance wiring driver 8 may be made common (the drive voltage of the auxiliary capacitance wiring is made the same as the drive voltage of the data signal line).

After the driving of the scanning signal line GLn in the lowermost row is completed, the display control circuit 9 turns on the backlight 4 in the vertical blanking period. Here, the backlight 4 is turned on after the response of the liquid crystal molecules of the pixel PXj is completed. However, the present embodiment is not limited thereto, a predetermined period may be provided between the driving of the scanning signal line GLn in the lowermost row and the turning-on of the backlight 4 so that the backlight 4 is turned on after the response of the liquid crystal molecules of the pixel PXn in the lowermost row is completed. If the period in which the backlight 4 is turned on is shortened, the response of the liquid crystal may be displayed in a more completed state, whereas if the period in which the backlight 4 is turned on is lengthened, the luminance may be easily secured. Before the next vertical period starts, the display control circuit 9 turns off the backlight 4.

Since the pixel potential of the pixel PXj has a negative polarity at the start of the next vertical period, the potential of the capacitance signal CS2 of the auxiliary capacitance wiring CLj corresponding to the pixel PXj is lowered. Therefore, the pixel potential PVj of the pixel PXj is lowered to V4 via the auxiliary capacitance C1.

In the pixels in odd rows, the polarity of the pixel potential and the change in the potential of the capacitance signal CS1 are reversed. The potentials of the capacitance signals CS1 and CS2 change, respectively so as to increase the absolute value of the pixel potential of the corresponding pixel (so that the absolute value of the electric field applied to the liquid crystal layer increases). If the polarity of the image data of the corresponding pixel is positive, the auxiliary capacitance wiring driver 8 increases the potential of the capacitance signal, and if the polarity of the image data of the corresponding pixel is negative, the auxiliary capacitance wiring driver 8 lowers the potential of the capacitance signal. The display control circuit 9 does not change the potentials of the capacitance signals CS1 and CS2 so that the change in the pixel potential due to the change in the potential of the capacitance signals CS1 and CS2 does not affect the luminance of the displayed pixel while the backlight 4 is turned on in a vertical period.

In this manner, the auxiliary capacitance wiring driver 8 changes the potential of the capacitance signal so that dielectric torque of liquid crystal molecules of each pixel (a pixel of black display to which at least the minimum voltage is applied) becomes larger (so that the absolute value of the pixel voltage becomes larger) while the backlight 4 is turned off. Here, the pixel voltage is the voltage between the counter electrode and the pixel electrode, and the absolute value of the pixel voltage is the absolute value of the pixel potential. In the normally black liquid crystal display device 1, increasing the absolute value of the pixel voltage means that the transmittance of the pixel becomes larger (eventually, the luminance of the pixel becomes larger). The auxiliary capacitance wiring driver 8 maintains the state in which the potential of the capacitance signal changes so that the dielectric torque of the liquid crystal molecules becomes larger, until the driving of the plurality of scanning signal lines GL1 to GLn is completed. The gate driver 6 writes the image data to each pixel by driving the plurality of scanning signal lines GL1 to GLn in a state in which the potential of the capacitance signal is changed so that the dielectric torque of the liquid crystal molecules becomes larger. The driving of the plurality of scanning signal lines GL1 to GLn is performed while the backlight 4 is turned off. As a result, it is possible to prevent the user from perceiving a change in the luminance of the pixel due to a change in the potential of the capacitance signal.

In the vertical alignment type liquid crystal display device of the related art, the response time of the liquid crystal layer becomes the longest in a case where the image data of low gradation (for example, gradation is 1 to 20, assuming the maximum gradation is 255) is written to the pixel of black display (gradation is 0). On the other hand, in the liquid crystal display device 1 of the present embodiment, as compared with the liquid crystal display device of the related art, it is possible to shorten the response time of the liquid crystal layer when the image data of low gradation is written to the pixel of black display. Therefore, in the liquid crystal display device 1, the maximum value of the response time in the entire gradation range becomes small, and the response time in the entire gradation range is averaged.

Embodiment 2

Other embodiments of the present disclosure will be described below. For the convenience of description, members having the same functions as the members described in the above embodiment are denoted by the same reference numerals, and description thereof will not be repeated. The liquid crystal display device of the present embodiment is different from Embodiment 1 in that a plurality of backlights that is turned on and off at different timings are included.

Configuration of Liquid Crystal Display Device

Figure 5:
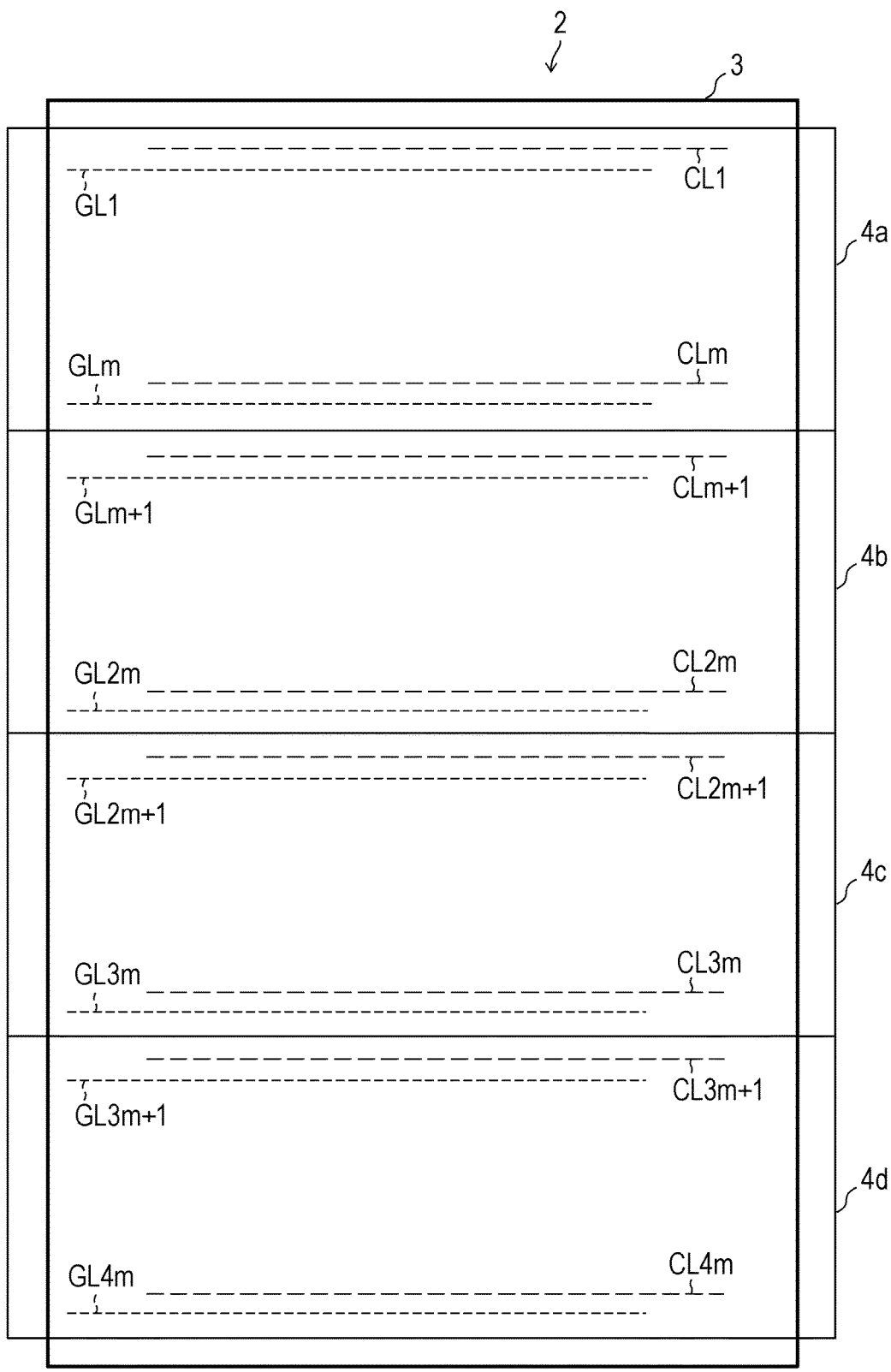
FIG. 5 is a schematic diagram showing a configuration of the liquid crystal display device of one embodiment.

FIG. 5 is a schematic diagram showing a configuration of a liquid crystal display device 2 of the present embodiment. The liquid crystal display device 2 includes the liquid crystal display panel 3, the plurality of backlights 4a to 4d (a first backlight to a fourth backlight), the gate driver 6, the data driver 7, the auxiliary capacitance wiring driver 8, and the display control circuit 9. In FIG. 5, the illustration of the gate driver 6, the data driver 7, the auxiliary capacitance wiring driver 8, and the display control circuit 9 is omitted. The liquid crystal display device 2 is a normally black vertical alignment type liquid crystal display device. The display control circuit 9 controls the plurality of backlights 4a to 4d. The configuration of the liquid crystal display panel 3 is the same as the above-described embodiment.

The backlights 4a to 4d irradiate different display regions of the liquid crystal display panel 3 with light. The liquid crystal display panel 3 includes a plurality of display regions (a first display region to a fourth display region) aligned in the scanning direction. The backlight 4a mainly illuminates the first display region, the backlight 4b mainly illuminates the second display region, the backlight 4c mainly illuminates the third display region, and the backlight 4d mainly illuminates the fourth display region.

The first display region corresponding to the backlight 4a includes a plurality of pixels corresponding to the plurality of scanning signal lines GL1 to GLm and the plurality of auxiliary capacitance wirings CL1 to CLm. The second display region corresponding to the backlight 4b includes a plurality of pixels corresponding to the plurality of scanning signal lines GLm+1 to GL2m and the plurality of auxiliary capacitance wirings CLm+1 to CL2m. The third display region corresponding to the backlight 4c includes a plurality of pixels corresponding to the plurality of scanning signal lines GL2m+1 to GL3m and the plurality of auxiliary capacitance wirings CL2m+1 to CL3m. The fourth display region corresponding to the backlight 4d includes a plurality of pixels corresponding to the plurality of scanning signal lines GL3m+1 to GL4m and the plurality of auxiliary capacitance wirings CL3m+1 to CL4m. The number of pixel rows included in the display region is n, and 4m=n. Here, the number of pixel rows included in each display region is equal to each other but may be different from each other.

Driving of Liquid Crystal Display Device

The liquid crystal display device 2 performs line inversion driving as a polarity inversion driving system. However, the present embodiment is not limited thereto, and the liquid crystal display device 2 may perform frame inversion driving, for example.

Figure 6:
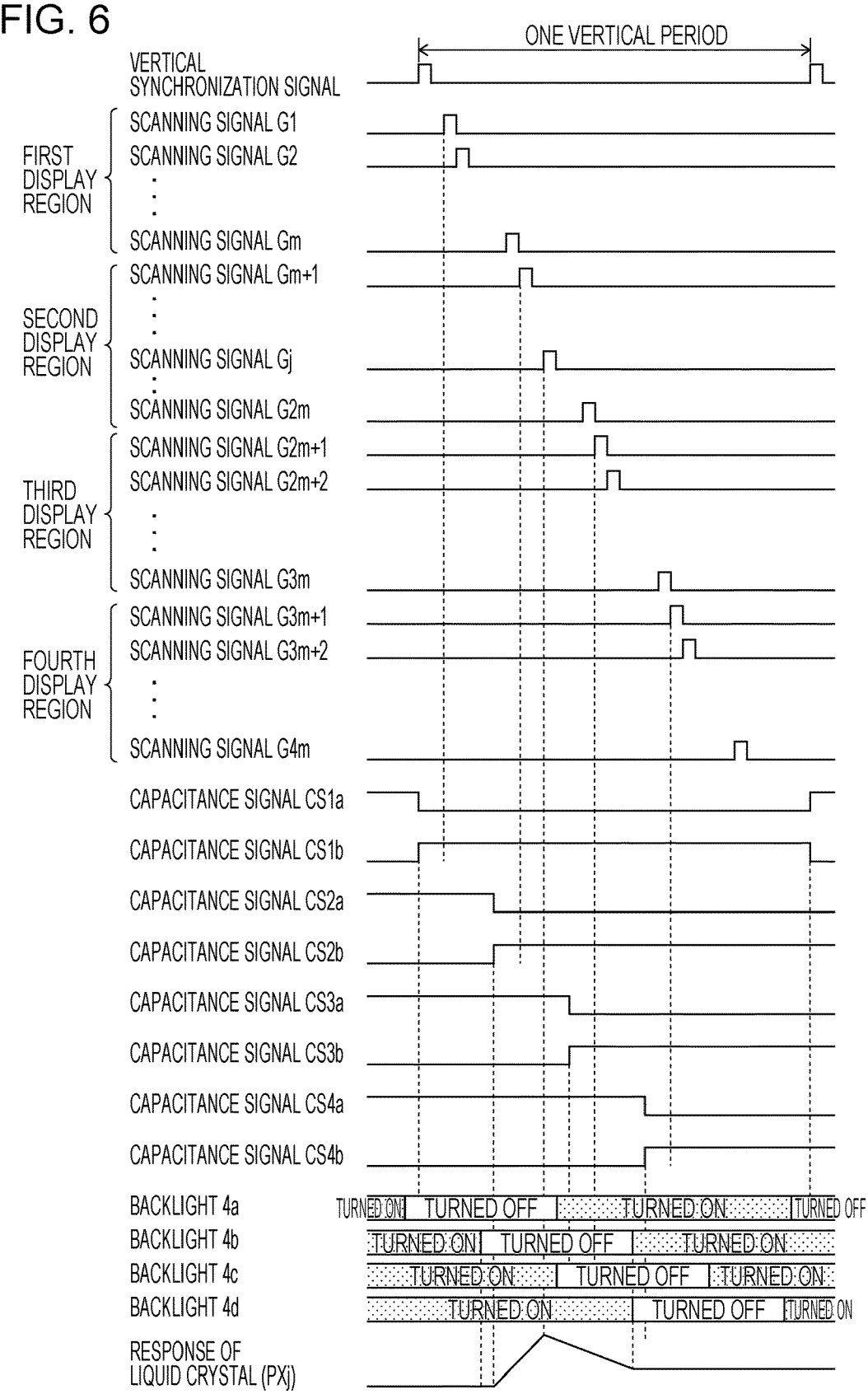
FIG. 6 is a timing chart showing an example of driving the liquid crystal display device in the certain vertical period.

FIG. 6 is a timing chart showing an example of driving the liquid crystal display device 2 in a certain vertical period. FIG. 6 shows the vertical synchronization signal, the potentials of scanning signals G1 to Gn supplied to scanning signal lines GL1 to GLn, respectively, the potentials of the capacitance signals CS1a to CS4a (CS1b to CS4b) supplied to the auxiliary capacitance wirings CL1 to CLn, the state of the backlight (turned on/off), and the alignment state of the liquid crystal in the pixel PXj of the j-th row of a certain pixel column (response of liquid crystal response), with respect to time (horizontal axis).

The auxiliary capacitance wiring driver 8 supplies a capacitance signal CS1a to each of the auxiliary capacitance wirings in the odd rows in the first display region and supplies the capacitance signal CS1b to each of the auxiliary capacitance wirings in the even rows in the first display region. The waveform of the capacitance signal CS1a is obtained by inverting the positive and negative of the waveform of the capacitance signal CS1b. The auxiliary capacitance wiring driver 8 supplies the capacitance signal CS2a to each of the auxiliary capacitance wirings in the odd rows in the second display region and supplies the capacitance signal CS2b to each of the auxiliary capacitance wirings in the even rows in the second display region. The waveform of the capacitance signal CS2a is obtained by inverting the positive and negative of the waveform of the capacitance signal CS2b. The auxiliary capacitance wiring driver 8 supplies the capacitance signal CS3a to each of the auxiliary capacitance wirings in the odd rows in the third display region and supplies the capacitance signal CS3b to each of the auxiliary capacitance wirings in the even rows in the third display region. The waveform of the capacitance signal CS3a is obtained by inverting the positive and negative of the waveform of the capacitance signal CS3b. The auxiliary capacitance wiring driver 8 supplies the capacitance signal CS4a to each of the auxiliary capacitance wirings in the odd rows in the fourth display region and supplies the capacitance signal CS4b to each of the auxiliary capacitance wirings in the even rows in the fourth display region. The waveform of the capacitance signal CS4a is obtained by inverting the positive and negative of the waveform of the capacitance signal CS4b.

In a vertical period, the backlights 4a to 4d are sequentially turned off and are turned on sequentially while shifting the timing. The auxiliary capacitance wiring driver 8 sequentially changes the potentials of the capacitance signals CS1a to CS4a (CS1b to CS4b) of the corresponding auxiliary capacitance wiring CL1 to CL4m in accordance with turning-off of each backlight 4a to 4d.

In each display region, the following operations (1) to (4) are sequentially performed. After (4), the flow returns to (1).
(1) The backlight corresponding to the display region is turned off.
(2) A plurality of auxiliary capacitance wirings corresponding to the display region are driven.
(3) A plurality of scanning signal lines corresponding to the display region are driven.
(4) The backlight corresponding to the display region is turned on.

The operation of the entire display regions will be described below. Before the vertical period starts, the display control circuit 9 turns off the backlight 4a. Thereafter, the display control circuit 9 outputs the vertical synchronization signal to the gate driver 6, the data driver 7, and the auxiliary capacitance wiring driver 8. When receiving the vertical synchronization signal, the auxiliary capacitance wiring driver 8 changes the potentials of the capacitance signals CS1a and CS1b corresponding to the first display region while the backlight 4a is turned off. The potentials of the capacitance signals CS1a and CS1b are kept constant over the length of a vertical period. The potentials of the capacitance signals CS1a, CS1b to CS4a, CS4b change every vertical period.

When receiving the vertical synchronization signal, the gate driver 6 sequentially drives the plurality of scanning signal lines GL1 to GL4m by supplying the scanning signals G1 to G4m to the plurality of scanning signal lines GL1 to GL4m corresponding to the first region to the fourth display region after the potentials of the capacitance signals CS1a and CS1b are changed. After the writing (driving of scanning signal Line GLm) of the data signal to the pixel in the lowermost row (the m-th row) of the first display region is completed, the display control circuit 9 turns on the backlight 4a.

In addition, after turning off the backlight 4a and before driving of the scanning signal line GLm+1 corresponding to the uppermost row (the (m+1)th row) of the second display region is started, the display control circuit 9 turns off the backlight 4b. The auxiliary capacitance wiring driver 8 changes the potentials of the capacitance signals CS2a and CS2b corresponding to the second display region before the driving of the scanning signal line GLm+1 is started while the backlight 4b is turned off. While the backlight 4b corresponding to the second display region is turned off, the corresponding plurality of scanning signal lines GLm+1 to GL2m are driven. After the writing (driving of scanning signal Line GL2m) of the data signal to the pixel in the lowermost row (the 2m-th row) of the second display region is completed, the display control circuit 9 turns on the backlight 4b.

Also for the third display region and the fourth display region, like the second display region, turning-off/turning-on of the corresponding backlight 4c and 4d, changing of the potentials of the corresponding capacitance signals CS3a, CS3b, CS4a, and CS4b, and driving of the corresponding plurality of scanning signal lines GL2m+1 to GL4m are sequentially performed. The periods in which the backlights 4b to 4d are turned on extend over the next vertical period.

The pixel PXj of the j-th row will be described. Here, it is assumed that the pixel PXj is in an odd number row of the second display region. It is assumed that a negative polarity data signal corresponding to black display (gradation 0) is written to the pixel PXj in the immediately preceding vertical period.

When a new vertical period starts, the potential of the capacitance signal CS2a of the auxiliary capacitance wiring CLj corresponding to the pixel PXj is lowered so that the dielectric torque of the liquid crystal molecules becomes larger while the backlight 4b corresponding to the pixel PXj is turned off. As a result, the absolute value of the pixel potential PVj of the pixel PXj rises via the auxiliary capacitance C1. As a result, the orientation of the liquid crystal molecules of the pixel PXj starts to change to an orientation corresponding to the changed pixel potential.

Thereafter, the scanning signal Gj becomes High level, and a positive polarity data signal having a polarity opposite to the immediately preceding vertical period is written to the pixel PXj. As a result, the pixel potential of the pixel PXj changes to a positive potential corresponding to the potential of the data signal (the gradation represented by the data signal). Then, the orientation of the liquid crystal molecules of the pixel PXj starts to change to an orientation corresponding to the potential of the written data signal. After the response time elapses, the orientation of the liquid crystal molecules of the pixel PXj is oriented corresponding to the gradation represented by the data signal.

The backlight 4a corresponding to the first display region may be turned on during a period in which the auxiliary capacitance wirings CLm+1 to CL4m and the scanning signal lines GLm+1 to GL4m corresponding to other display regions (the second display region to the fourth display region) are driven. The same applies to the other backlights 4b to 4d. In this way, it is possible to ensure a long period in which each of the backlights 4a to 4d is turned by providing the plurality of backlights 4a to 4d individually drivable corresponding to the plurality of display regions.

The number of display regions on the liquid crystal display panel 3 and the number of corresponding backlights may be two or three or more. In addition, here, for the sake of convenience, a configuration using a plurality of backlights has been described, but a single backlight having a plurality of light emitting regions may be used.

Embodiment 3

Other embodiments of the present disclosure will be described below. For the convenience of description, the description of the same matters as those in the above-described embodiment will be omitted. In Embodiments 1 and 2, a normally black vertical alignment type liquid crystal display device has been described as an example, but one embodiment of the present disclosure may also be applied to a normally white liquid crystal display device. In addition, one embodiment of the present disclosure may also be applied to a TN type liquid crystal display device.

For example, in a normally white TN type liquid crystal display device, the same driving as in Embodiments 1 and 2 may be performed. In this case, in a state in which no voltage is applied to the pixel, θ=90°. Also in the normally white TN type liquid crystal display device, the auxiliary capacitance wiring driver changes the potential of the capacitance signal so that the dielectric torque of the liquid crystal molecules in the state of white display (the state in which the minimum voltage is applied) becomes larger (so that the absolute value of the pixel voltage becomes larger), while the backlight is turned off. In other words, the auxiliary capacitance wiring driver changes the potential of the capacitance signal so that the transmittance of the corresponding pixel becomes smaller while the backlight is turned off. The gate driver writes the image data to each pixel by driving the plurality of scanning signal lines in a state in which the potential of the capacitance signal is changed so that the dielectric torque of the liquid crystal molecules becomes larger. In a normally white TN type liquid crystal display device, for example, in the case of transitioning from white display to high gradation display, it is possible to shorten the response time of the liquid crystal by the above-described driving.

Summarization

According to Aspect 1 of the present disclosure, the liquid crystal display devices (1 and 2) are configured to include a data driver (7) that writes image data (data signal) to a plurality of pixels (PXj), a scanning signal line driver (gate driver 6) that drives a plurality of scanning signal lines, a plurality of auxiliary capacitance wirings (CLj) that form an auxiliary capacitance (C1) between the plurality of auxiliary capacitance wirings and the plurality of pixels, an auxiliary capacitance wiring driver (8) that drives the plurality of auxiliary capacitance wirings, and a first backlight (backlight 4 and 4a), in which the auxiliary capacitance wiring driver changes a potential of a first auxiliary capacitance wiring so that dielectric torque of liquid crystal molecules (30) of a first pixel, to which a minimum voltage is written, corresponding to the first backlight becomes larger while the first backlight is turned off, and the scanning signal line driver drives the scanning signal line so that the image data is written to the first pixel in a state in which the potential of the first auxiliary capacitance wiring is changed so that the dielectric torque of the liquid crystal molecules of the first pixel becomes larger.

According to the above-described configuration, image data is written to the first pixel in a state in which the dielectric torque of the liquid crystal molecules of the first pixel becomes larger by driving the auxiliary capacitance wiring. Therefore, it is possible to increase the response speed of the liquid crystal molecules of the first pixel. In addition, since the potential of the first pixel changes, while the first backlight is turned off, it is possible to prevent the user from perceiving a change in the luminance of the pixel due to a change in the potential of the auxiliary capacitance wiring.

According to Aspect 2 of the present disclosure in the above-described Aspect 1, a liquid crystal display device may be configured to include the second backlight (backlight 4b) that irradiates a region different from a region where the first backlight irradiates with light, with light, in which the first backlight and the second backlight are turned on and off at different timings, the auxiliary capacitance wiring driver changes the potentials of the second auxiliary capacitance wirings (CLm+1 to CL2m) corresponding to the second pixel so that the dielectric torque of the liquid crystal molecules of the second pixel, to which the minimum voltage is written, corresponding to the second backlight becomes larger while the second backlight is turned off, and the scanning signal line driver drives the scanning signal line so that the image data is written to the second pixel in a state in which the potential of the second auxiliary capacitance wiring is changed so that the dielectric torque of the liquid crystal molecules of the second pixel becomes larger.

According to the above-described configuration, it is possible to ensure a long period in which each backlight is turned on.

According to Aspect 3 of the present disclosure, a liquid crystal display device may be configured such that the scanning signal line driver drives the scanning signal line so that the image data is written to the first pixel before the second pixel in a vertical period and the first backlight may be turned on before the second backlight after the image data is written to the first pixel in a vertical period in the above-described Aspect 2.

According to Aspect 4 of the present disclosure, a liquid crystal display device may be configured such that the auxiliary capacitance wiring driver changes the potential of the first auxiliary capacitance wiring so that the absolute value of the pixel voltage of the first pixel becomes larger while the first backlight is turned off in the above-described Aspects 1 to 3.

According to Aspect 5 of the present disclosure, a liquid crystal display device may be configured to include a liquid crystal layer of vertical alignment or twist nematic alignment in the above-described Aspects 1 to 4.

According to Aspect 6 of the present disclosure, a liquid crystal display device may be configured such that the auxiliary capacitance wiring driver does not change the potential of the first auxiliary capacitance wiring while the first backlight is turned on in a vertical period in the above-described Aspects 1 to 5.

According to Aspect 7 of the present disclosure, a liquid crystal display device may be configured such that the liquid crystal display device is a normally black liquid crystal display device and the auxiliary capacitance wiring driver changes the potential of the first auxiliary capacitance wiring so that the transmittance of the first pixel becomes larger while the first backlight is turned off in the above-described Aspects 1 to 6.

According to Aspect 8 of the present disclosure, a liquid crystal display device may be configured such that the liquid crystal display device is a normally white liquid crystal display device and the auxiliary capacitance wiring driver changes the potential of the first auxiliary capacitance wiring so that the transmittance of the first pixel becomes smaller while the first backlight is turned off in the above-described Aspects 1 to 6.

According to Aspect 9 of the present disclosure, a driving method of a liquid crystal display device is a driving method of a liquid crystal display device including a plurality of auxiliary capacitance wirings forming an auxiliary capacitance between the plurality of auxiliary capacitance wirings and a plurality of pixels and a first backlight, including changing a potential of a first auxiliary capacitance wiring so that a dielectric torque of liquid crystal molecules of a first pixel, to which a minimum voltage is written, corresponding to the first backlight becomes larger while the first backlight is turned off and writing the image data to the first pixel in a state in which the potential of the first auxiliary capacitance wiring is changed so that the dielectric torque of the liquid crystal molecules of the first pixel becomes larger.

The present disclosure is not limited to the above-described embodiments, and various modifications are possible within the scope indicated in the claims, and embodiments obtained by appropriately combining technical means respectively disclosed in different embodiments are also included in the technical scope of the present disclosure. Furthermore, by combining technical means disclosed in each embodiment, new technical features may be formed.

The present disclosure contains subject matter related to that disclosed in Japanese Priority Patent Application JP 2017-193627 filed in the Japan Patent Office on Oct. 3, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a data driver writing image data to a plurality of pixels;
a scanning signal line driver driving a plurality of scanning signal lines;
a plurality of auxiliary capacitance wirings forming an auxiliary capacitance between the plurality of auxiliary capacitance wirings and the plurality of pixels;
an auxiliary capacitance wiring driver driving the plurality of auxiliary capacitance wirings; and
a first backlight,
wherein the auxiliary capacitance wiring driver changes a potential of a first auxiliary capacitance wiring so that dielectric torque of liquid crystal molecules of a first pixel, to which a minimum voltage is written, corresponding to the first backlight becomes larger while the first backlight is turned off, and
the scanning signal line driver drives the scanning signal line so that the image data is written to the first pixel in a state in which the potential of the first auxiliary capacitance wiring is changed so that the dielectric torque of the liquid crystal molecules of the first pixel becomes larger.

2. The liquid crystal display device according to claim 1, further comprising:
a second backlight irradiating a display region different from a display region irradiated by the first backlight,
wherein the first backlight and the second backlight are turned on and off at different timings,
the auxiliary capacitance wiring driver changes a potential of a second auxiliary capacitance wiring corresponding to a second pixel so that a dielectric torque of liquid crystal molecules of the second pixel, to which a minimum voltage is written, corresponding to the second backlight becomes larger while the second backlight is turned off, and
the scanning signal line driver drives the scanning signal line so that the image data is written to the second pixel in a state in which the potential of the second auxiliary capacitance wiring is changed so that the dielectric torque of the liquid crystal molecules of the second pixel becomes larger.

3. The liquid crystal display device according to claim 2, wherein, in a vertical period, the scanning signal line driver drives the scanning signal line so that the image data is written to the first pixel prior to the second pixel, and
in a vertical period, after the image data is written to the first pixel, the first backlight is turned on prior to the second backlight.

4. The liquid crystal display device according to claim 1, where the auxiliary capacitance wiring driver changes the potential of the first auxiliary capacitance wiring so that an absolute value of a pixel voltage of the first pixel becomes larger while the first backlight is turned off.

5. The liquid crystal display device according to claim 1, further comprising:
a liquid crystal layer of vertical alignment or twist nematic alignment.

6. The liquid crystal display device according to claim 1, wherein the auxiliary capacitance wiring driver does not change the potential of the first auxiliary capacitance wiring while the first backlight is turned on in a vertical period.

7. The liquid crystal display device according to claim 1, wherein the light crystal display device is a normally black liquid crystal display device, and
the auxiliary capacitance wiring driver changes the potential of the first auxiliary capacitance wiring so that transmittance of the first pixel becomes larger while the first backlight is turned off.

8. The liquid crystal display device according to claim 1, wherein the liquid crystal display device is a normally white liquid crystal display device, and the auxiliary capacitance wiring driver changes the potential of the first auxiliary capacitance wiring so that transmittance of the first pixel becomes smaller while the first backlight is turned off.

9. A method of driving a liquid crystal display device including a plurality of auxiliary capacitance wirings forming an auxiliary capacitance between the plurality of auxiliary capacitance wirings and a plurality of pixels, and a first backlight, the method comprising:
- changing a potential of a first auxiliary capacitance wiring so that a dielectric torque of liquid crystal molecules of a first pixel, to which a minimum voltage is written, corresponding to the first backlight becomes larger while the first backlight is turned off, and
- writing image data to the first pixel in a state in which the potential of the first auxiliary capacitance wiring is changed so that the dielectric torque of the liquid crystal molecules of the first pixel becomes larger.

* * * * *